(12) United States Patent
Namuduri et al.

(10) Patent No.: US 8,174,377 B2
(45) Date of Patent: May 8, 2012

(54) SUSPENSION HEIGHT SENSOR

(75) Inventors: Chandra S. Namuduri, Troy, MI (US); Yunjun Li, West Bloomfield, MI (US); Timothy J. Talty, Beverly Hills, MI (US); Robert B. Elliott, Waterford, MI (US); Nancy McMahon, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 341 days.

(21) Appl. No.: 12/271,551

(22) Filed: Nov. 14, 2008

(65) Prior Publication Data

US 2010/0123568 A1 May 20, 2010

(51) Int. Cl.
*B60Q 1/00* (2006.01)

(52) U.S. Cl. .......................................... 340/438; 342/70

(58) Field of Classification Search ................... 340/438, 340/686.1, 825.69, 825.72; 342/70; 701/37
See application file for complete search history.

(56) References Cited

U.S. PATENT DOCUMENTS

| | | | |
|---|---|---|---|
| 2,594,755 A | 4/1952 | Felt | |
| 4,297,609 A | 10/1981 | Hirao et al. | |
| 4,458,234 A | 7/1984 | Brisard | |
| 4,600,215 A | 7/1986 | Kuroki et al. | |
| 4,757,315 A * | 7/1988 | Lichtenberg et al. | 342/51 |
| 4,817,922 A * | 4/1989 | Hovance | 267/64.21 |
| 4,822,063 A | 4/1989 | Yopp et al. | |
| 4,827,416 A | 5/1989 | Kawagoe et al. | |
| 4,836,578 A | 6/1989 | Soltis | |
| 5,009,450 A | 4/1991 | Herberg et al. | |
| 5,056,913 A | 10/1991 | Tanaka et al. | |
| 5,103,396 A | 4/1992 | Hiwatashi et al. | |
| 5,127,667 A | 7/1992 | Okuda et al. | |
| 5,218,308 A | 6/1993 | Posebeck et al. | |
| 5,251,729 A | 10/1993 | Nehl et al. | |
| 5,267,466 A | 12/1993 | Morris | |
| 5,347,186 A | 9/1994 | Konotchick | |
| 5,373,445 A * | 12/1994 | Yopp | 701/37 |
| 5,390,949 A | 2/1995 | Naganathan et al. | |
| 5,450,322 A | 9/1995 | Tanaka et al. | |
| 5,461,564 A | 10/1995 | Collins et al. | |
| 5,638,927 A | 6/1997 | Cheatham et al. | |
| 5,944,763 A | 8/1999 | Iwasaki | |

(Continued)

FOREIGN PATENT DOCUMENTS

DE 39 09 190 C1 8/1990

(Continued)

OTHER PUBLICATIONS

Namuduri, Chandra S. et al. "Notice of Allowance" mailed Jan. 4, 2011; U.S. Appl. No. 12/394,438, filed Feb. 27, 2009.

(Continued)

*Primary Examiner* — John A Tweel, Jr.
(74) *Attorney, Agent, or Firm* — Ingrassia Fisher & Lorenz, P.C.

(57) ABSTRACT

A system is provided for determining a distance between a first portion of a vehicular suspension assembly and a second portion of the suspension assembly. The system comprises a transceiver coupled to the first portion for emitting a first signal toward the second portion, and for receiving a reflection of the first signal from the second portion, and a processor coupled to the transceiver for determining the distance between the first portion and the second portion.

19 Claims, 6 Drawing Sheets

U.S. PATENT DOCUMENTS

| | | | |
|---|---|---|---|
| 5,990,441 | A | 11/1999 | Zaenglein et al. |
| 6,069,581 | A * | 5/2000 | Bell et al. ............. 342/70 |
| 6,111,375 | A | 8/2000 | Zenobi |
| 6,209,691 | B1 | 4/2001 | Fehring et al. |
| 6,234,654 | B1 | 5/2001 | Okuchi et al. |
| 6,328,144 | B1 | 12/2001 | Hayakawa et al. |
| 6,427,812 | B2 | 8/2002 | Crawley et al. |
| 6,502,837 | B1 | 1/2003 | Hamilton et al. |
| 6,614,239 | B2 | 9/2003 | Borghi |
| 6,694,856 | B1 | 2/2004 | Chen et al. |
| 6,771,007 | B2 | 8/2004 | Tanielian |
| 6,866,127 | B2 | 3/2005 | Nehl et al. |
| 6,938,311 | B2 | 9/2005 | Tanielian |
| 7,057,330 | B2 | 6/2006 | Buhler et al. |
| 7,123,351 | B1 | 10/2006 | Schaefer |
| 7,221,437 | B1 | 5/2007 | Schaefer |
| 7,250,697 | B2 | 7/2007 | Beaulieu |
| 7,261,171 | B2 | 8/2007 | De La Torre et al. |
| 7,380,800 | B2 | 6/2008 | Klees |
| 7,420,462 | B2 * | 9/2008 | Nordmeyer ............. 340/438 |
| 7,521,841 | B2 | 4/2009 | Clingman et al. |
| 7,654,370 | B2 | 2/2010 | Cubalchini, Jr. |
| 7,733,239 | B2 * | 6/2010 | Nordmeyer ............. 340/825.72 |
| 7,737,608 | B2 | 6/2010 | Ruggeri et al. |
| 7,770,701 | B1 | 8/2010 | Davis |
| 7,777,396 | B2 | 8/2010 | Rastegar et al. |
| 7,839,058 | B1 | 11/2010 | Churchill et al. |
| 7,849,983 | B2 | 12/2010 | St. Clair et al. |
| 7,948,613 | B2 | 5/2011 | Fourcault et al. |
| 2002/0032508 | A1 | 3/2002 | Uchino et al. |
| 2003/0034697 | A1 | 2/2003 | Goldner et al. |
| 2005/0077692 | A1 | 4/2005 | Ogawa |
| 2005/0090956 | A1 | 4/2005 | Ogawa |
| 2005/0270221 | A1 | 12/2005 | Fedotov et al. |
| 2006/0176158 | A1 | 8/2006 | Fleming |
| 2006/0186586 | A1 | 8/2006 | Soles et al. |
| 2006/0188120 | A1 | 8/2006 | Fisher |
| 2006/0271678 | A1 | 11/2006 | Jessup et al. |
| 2007/0032913 | A1 | 2/2007 | Ghoneim et al. |
| 2007/0129865 | A1 | 6/2007 | Kim |
| 2007/0205881 | A1 | 9/2007 | Breed |
| 2007/0251776 | A1 | 11/2007 | Braun |
| 2008/0116849 | A1 | 5/2008 | Johnston |
| 2008/0252174 | A1 | 10/2008 | Mohammadi et al. |
| 2008/0277939 | A1 | 11/2008 | Richardson et al. |
| 2008/0284258 | A1 | 11/2008 | Spratte et al. |
| 2009/0021720 | A1 | 1/2009 | Hecker |
| 2009/0045698 | A1 | 2/2009 | Genis et al. |
| 2009/0278927 | A1 | 11/2009 | Ishiyama et al. |
| 2010/0045143 | A1 | 2/2010 | Martin |
| 2010/0052475 | A1 | 3/2010 | Lee |
| 2010/0084947 | A1 | 4/2010 | Yoon et al. |
| 2010/0094503 | A1 | 4/2010 | Li et al. |
| 2010/0123568 | A1 | 5/2010 | Namuduri et al. |
| 2010/0125389 | A1 | 5/2010 | Talty et al. |
| 2010/0219641 | A1 | 9/2010 | Namuduri et al. |
| 2010/0219720 | A1 | 9/2010 | Namuduri et al. |
| 2010/0219721 | A1 | 9/2010 | Namuduri et al. |
| 2010/0219798 | A1 | 9/2010 | Namuduri et al. |
| 2010/0225527 | A1 | 9/2010 | Talty et al. |
| 2010/0244629 | A1 | 9/2010 | Nagashima et al. |

FOREIGN PATENT DOCUMENTS

| | | |
|---|---|---|
| DE | 41 12 276 C2 | 11/1992 |
| DE | 295 18 322 U1 | 1/1996 |
| DE | 103 58 764 A1 | 7/2005 |
| DE | 10 2004 010 229 A1 | 9/2005 |
| DE | 10 2005 008 403 A1 | 9/2006 |
| FR | 2594755 A3 | 8/1987 |
| GB | 2 098 007 A | 11/1982 |
| JP | 60101425 A | 6/1985 |
| JP | 4359901 B1 | 11/2009 |

OTHER PUBLICATIONS

Notice of Allowance mailed Nov. 18, 2010, issued in U.S. Appl. No. 12/394,438.

Notice of Allowance mailed Oct. 8, 2010, issued in U.S. Appl. No. 12/400,112.

Sang-Dong, K., et al., "Performance Analysis of UWB Radar for Vehicle in Multi-User Environments," 10th International Conference on Advanced Communication Technology, ICACT. Feb. 17-20, 2008, pp. 1036-1039, vol. 2.

Samkov, S.V., "Signal Processing in UWB Radars of Small Distance," 2004 Second International Workshop on Ultrawideband and Ultrashort Impulse Signals. Sep. 19-22, 2004, pp. 208-210.

Optek Technology, Inc. "OPTEK's Autopad Contactless Sensor Delivers Absolute Position, Angle and Linear Displacement Sensing." [Retrieved on Aug. 11, 2008]. Retrieved from Internet: <URL: http://license.icopyright.net/user/viewFreeUse.act?fuid=MTM4Mjg4MQ%3D%3D>.

Li, Y., et al. "Self-Powered Vehicle Sensor Systems," U.S. Appl. No. 12/900,707, Dec. 18, 2010.

German Office Action for German Application No. 10 2009 047 855.8-21 mailed Jan. 21, 2011.

German Office Action for German Application No. 10 2009 052 717.6-21 mailed Feb. 16, 2011.

Chinese Office Action for Chinese Application No. 200910206391.1 mailed Jan. 19, 2011.

German Office Action for German Application No. 10 2010 008 318.6 mailed May 11, 2011.

U.S. Office Action dated Jul. 6, 2011 for U.S. Appl. No. 12/252,114.

U.S. Notice of Allowance dated Jul. 18, 2011 for U.S. Appl. No. 12/394,322.

U.S. Office Action dated Jun. 17, 2011 for U.S. Appl. No. 12/394,326.

U.S. Office Action dated Aug. 1, 2011 for U.S. Appl. No. 12/272,074.

U.S. Office Action for U.S. Appl. No. 12/394,328 mailed Jun. 10, 2011.

Notice of Allowance, dated Nov. 16, 2011, for U.S. Appl. No. 12/394,326.

Notice of Allowance, dated Dec. 12, 2011, for U.S. Appl. No. 12/252,114.

Notice of Allowance, dated Jan. 9, 2012, for U.S. Appl. No. 12/272,074.

* cited by examiner

SUSPENSION HEIGHT SENSOR

TECHNICAL FIELD

The present invention generally relates to vehicular suspension systems, and more particularly relates to a suspension height sensor integrated into a vehicular suspension system.

BACKGROUND OF THE INVENTION

Control systems that automatically regulate ride height have been integrated into the suspensions of many vehicles. These systems rely on height sensors to provide real-time feedback on the distance or relative height between selected suspension components of sprung and unsprung vehicle masses. These data may be relayed to controllers that respond to height variations by adjusting compensating elements in the suspension to provide greater chassis stability. Accuracy in relative height measurement enables a more precise system response and thereby enhances vehicle performance characteristics including ride comfort and handling especially during cornering, acceleration, and braking.

Typical suspension height sensors use mechanical linkages connected between monitoring points in the suspension that convert linear displacement to a rotary motion. A contacting or non-contacting, electro-mechanical sensor converts this angular displacement to an electrical signal indicative of the relative height. However such systems often include mounting arms, sensor links and brackets, and a myriad of associated connecting fasteners and therefore increase part count and complicate assembly and servicing. Further, the exposure of these systems to the undercarriage of a vehicle increases their vulnerability to contamination and road debris that can cause damage or degrade long term performance and reliability.

Accordingly, there is a need to provide a suspension height sensor for a vehicle that is simpler to assemble, more convenient to service, and reduces part count. Further, other desirable features and characteristics of the present invention will become apparent from the subsequent detailed description and the appended claims, taken in conjunction with the accompanying drawings and the foregoing technical field and background.

SUMMARY OF THE INVENTION

In accordance with an embodiment, by way of example only, a system is provided for determining a distance between a first portion of a vehicular suspension assembly and a second portion of the suspension assembly. The system comprises a transceiver coupled to the first portion for emitting a first signal toward the second portion, and for receiving a reflection of the first signal from the second portion, and a processor coupled to the transceiver for determining the distance between the first portion and the second portion.

In accordance with another embodiment, by way of example only, a system is provided for determining a distance between a first portion of a vehicular suspension assembly and a second portion of the suspension assembly. The system comprises a transmitter coupled to a first portion for emitting a first signal, a receiver coupled to a second portion for detecting the first signal, and a processor coupled to the transmitter and the receiver, the processor configured to determine the distance between the first portion and the second portion.

In accordance with yet another embodiment, by way of example only, a system is provided for determining a distance of travel of an actuator assembly for a vehicular suspension assembly. The suspension assembly has a first member and a second member, and the actuator assembly has a first end coupled to the first member and a second end coupled to the second member. The system comprises a transceiver coupled to the first end for emitting a first signal, and for receiving a reflection of the first signal from the second end, a reflector coupled to the second end for reflecting the first signal, and a processor coupled to the transceiver for determining the distance of travel.

DESCRIPTION OF THE DRAWINGS

A more complete understanding of the present invention may be derived by referring to the detailed description and claims when considered in conjunction with the following figures, wherein like reference numbers refer to similar elements throughout the figures.

DESCRIPTION OF AN EXEMPLARY EMBODIMENT

The various embodiments of the present invention described herein provide an electronic height sensing system or height sensor for a vehicular suspension that measures the distance or relative height between selected components such as, for example, between the sprung and unsprung vehicle masses. When coupled to a suitable accompanying processor, a quantified determination of relative height useful to a chassis control system is achieved. Such relative height information may be further used to determine the distance of travel of various types of suspension actuators, including but not limited to linear actuators. Electromagnetic or ultrasonic wave transmitters or transceivers coupled to a first suspension component emit signals toward either a receiver or a reflector coupled to a second suspension component that receives the source signal directly or reflects the source signal back to the transceiver. Such transmitting/receiving devices may send electronic signals in the form of, for example, timing pulses or digitized data, indicative of relative height to a coupled processor configured to use these signals in determining the actual relative height between components. Data relating to relative height may also be used to determine the relative velocity and acceleration between suspension points being monitored and, combined with distance of travel data, can be used by a chassis controller to better optimize responsive adjustments made to controlled suspension components. Further, system elements used for signal emission and detection may assume a wide variety of configurations and locations on a vehicle suspension to accommodate gathering data relating to chassis movements, and to be conveniently accessible for service when needed.

Figure 1:
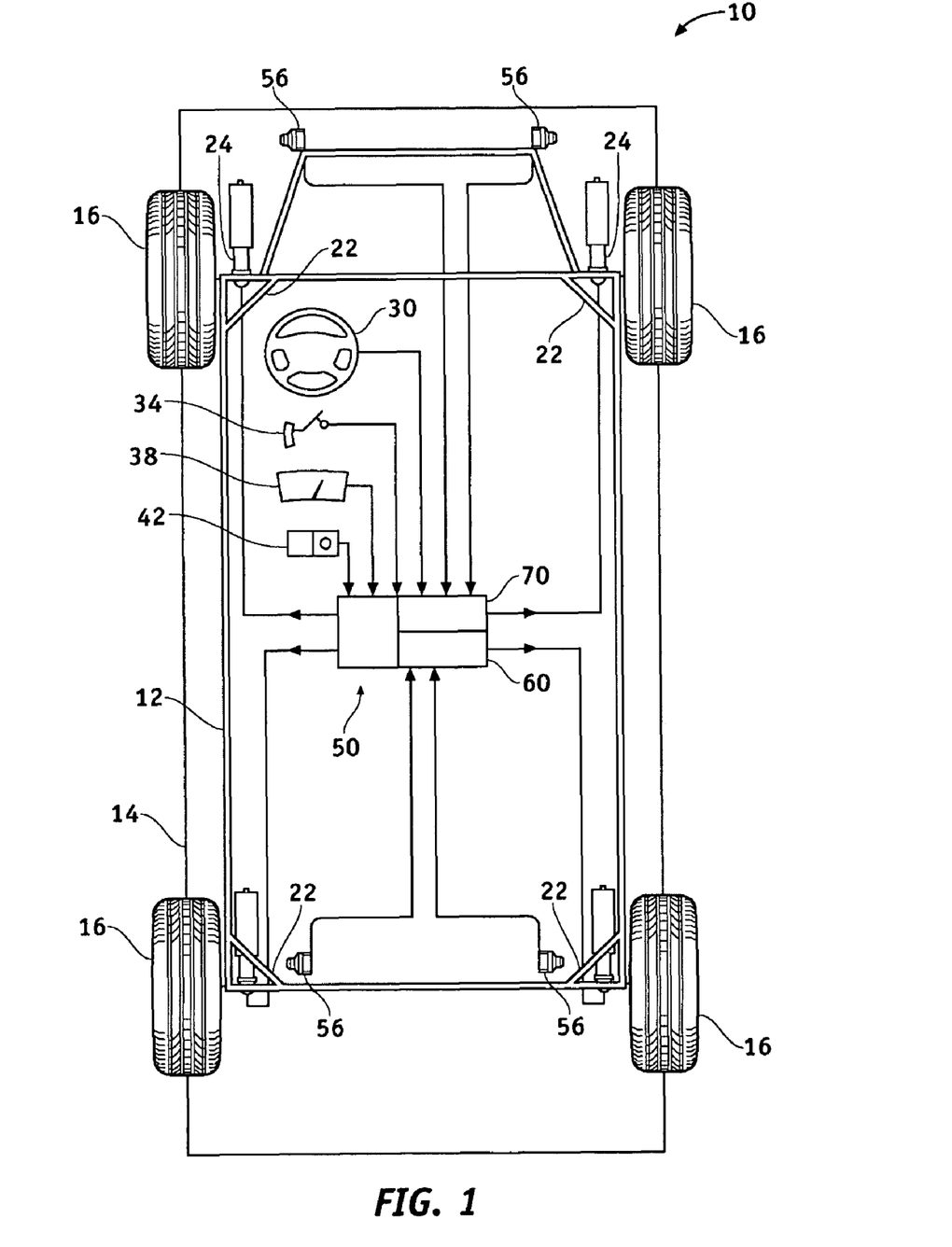
FIG. 1 is a schematic view of an exemplary vehicle illustrating the manner in which an embodiment is integrated with various sub-components of the vehicle.

FIG. 1 is a plan view of a vehicle 10 (e.g., an automobile) for use in conjunction with one or more embodiments of the present invention. Vehicle 10 includes a chassis 12, a body 14, four wheels 16, a suspension assembly 22, and a chassis control module (or CCM) 50. Body 14 is arranged on the chassis 12 and substantially encloses the other components of the vehicle 10. Body 14 and chassis 12 may jointly form a frame. The wheels 16 are each rotationally coupled to chassis 12 near a respective corner of body 14. Suspension assembly 22 is configured to provide a damped and stabilized coupling between a sprung vehicle mass including body 14, and an unsprung mass including wheels 16 and portions of chassis 12. Suspension assembly 22 may include springs, linear actuators, and other interconnecting and supporting members, and further includes at least one damper assembly 24 such as a shock absorber or a strut, or the like, for providing damped motion between sprung and unsprung vehicle masses. Damper assemblies 24 may be configured to respond passively to vehicle motion, or as shown in FIG. 1, may be coupled to CCM 50 and configured to provide actively controlled suspension adjustments as directed thereby. As shown, vehicle 10 has four such damper assemblies 24 coupled to suspension assembly 22 proximate to wheels 16, and coupled in communication with CCM 50.

Vehicle 10 may be any of a variety of vehicle types, such as, for example, a sedan, a wagon, a truck, or a sport utility vehicle (SUV), and may be two-wheel drive (2WD) (i.e., rear-wheel drive or front-wheel drive), four-wheel drive (4WD), or all-wheel drive (AWD). Vehicle 10 may also incorporate any one of, or combination of, a number of different types of engines, such as, for example, a gasoline or diesel fueled combustion engine, a "flex fuel vehicle" (FFV) engine (i.e., using a mixture of gasoline and alcohol), a gaseous compound (e.g., hydrogen and/or natural gas) fueled engine, or a fuel cell, a combustion/electric motor hybrid engine, and an electric motor.

Chassis control module 50 is coupled in communication with various automotive sub-system sensors including a steering sensor 30 for determining steering direction, a lift/dive sensor 34 used to monitor chassis response to braking and accelerating, and a speed sensor 38 for measuring vehicle speed. CCM 50 also includes a user interface 42 whereby a driver may enter various system commands and receive therefrom other pertinent system information. CCM 50 is also coupled in communication with various vehicle height sensors 56 coupled to body 14, chassis 12, and/or suspension assembly 22 for monitoring vehicle height. CCM 50 also includes at least a processor 60 for processing vehicle height information received from height sensors 56, and a controller 70 coupled to processor 60 for relaying electronic commands to controlled suspension components including, for example, damper assemblies 24 in response to processor prompts. During operation, height sensors 56 monitor the distance between selected suspension, body, and/or chassis components, and generate signals indicative of this distance to processor 60. Processor 60 converts these signals to data that is useful to controller 70 in making appropriate compensating chassis adjustments.

Figure 2:
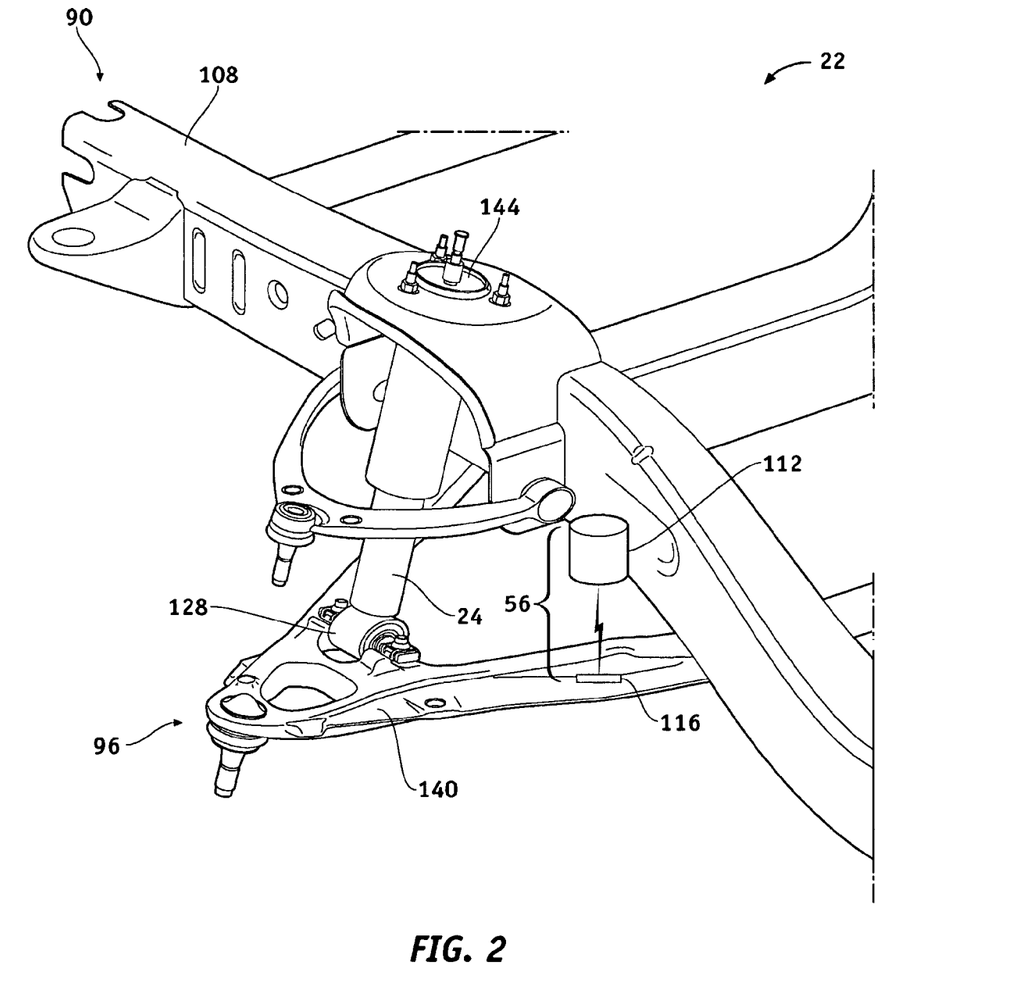
FIG. 2 is an isometric view of a vehicular suspension assembly for use in the vehicle depicted in FIG. 1 in accordance with an exemplary embodiment of the present invention.

FIG. 2 illustrates selected components of height sensor 56 integrated into suspension assembly 22 in accordance with an exemplary embodiment. Suspension assembly 22 includes damper assembly 24 coupled between a sprung vehicle mass 90 and an unsprung vehicle mass 96, and configured to dampen vertical motion therebetween in a well known manner. Damper assembly 24 has a first end coupled to a lower control arm 140 of unsprung mass 96 by a lower mount 128, and a second end coupled to a frame structural member 108 of sprung mass 90 by an upper mount 144. Mounting of damper assembly 24 to structural members and control arms may be done in any conventional manner using mounting brackets and fasteners. Height sensor 56 includes a transceiver 112 electrically coupled in communication with processor 60 (FIG. 1) and mechanically coupled to any suitable component of the sprung vehicle mass such as shown, for example, to frame structural member 108. Height sensor 56 also includes a reflector 116 that may be coupled to any suitable component of the unsprung vehicle mass such as, for example, to lower control arm 140. While sensing elements are illustrated as being positioned on suspension assembly 22 in accord with a specific configuration, it should be appreciated that many other possible configurations and suitable locations for mounting of these elements exist.

Transceiver 112 is configured to emit interrogation signals toward reflector 116 when prompted by processor 60 (FIG. 1), and to receive the interrogation signals reflected back from reflector 116. The interrogation signals may be electromagnetic in nature including but not limited to ultra wide band (UWB) radar, infrared (IR), or laser light radiation, or may comprise an ultrasonic pressure (sound) wave. Reflector 116 may comprise any suitable surface reflective of the type of signal used. Depending on the type of signals used, transceiver 112 and reflector 116 may be positioned so as to have a substantially clear line-of-sight with each other to enable such signal transfer.

During operation, transceiver 112 and reflector 116 each move with the sprung and unsprung masses, respectively, and the distance therebetween dynamically changes in accordance with vehicle motion and road conditions. Transceiver 112 emits interrogation signals when prompted by processor 60 (FIG. 1) that reflect from the surface of reflector 116 back to transceiver 112. Processor 60 records the time of prompting, and transceiver 112 detects the reflected interrogation signals, and relays an electronic signal to processor 60 indicative of the time of detection. Processor 60 is configured with algorithms for converting such timing information to the actual time differential between emission and detection, and for determining the distance or relative height differential between sprung and unsprung vehicle masses, H, using an algorithm that may include equation (1) below:

$$H = 0.5 c \times [\Delta t] \tag{1}$$

where c is the speed of propagation of the emitted signal, and $\Delta t$ is the time differential between emission and detection. In addition, the emitted signals may be pulsed having a duration and/or cadence optimized for use with the range of relative height range typical of a vehicle suspension system, and/or varied to encode the signal to enhance source recognition and mitigate the effects of stray light or other types of false signals.

Transceiver 112 is configured to both emit and detect signals and may comprise one of a variety of emission/detection systems based upon either electromagnetic radiation or sound waves. In one embodiment, transceiver 112 comprises a transmitter component configured to emit short-duration UWB or radar pulses that may include wavelengths in the radio and/or microwave frequency ranges. One example of such a commercially available UWB transceiver is manufactured by Freescale Semiconductor bearing part number XS 100. The detection component of transceiver 112 may be based upon RFCMOS (radio frequency, complementary metal oxide semiconductor) technology and is tuned to be compatible with the transmitter. In another embodiment, the transmitting component of transceiver 112 is a semiconductor-based laser diode that emits/detects light over a very narrow range of wavelengths. The detecting component may also be a semiconductor diode configured to detect light at the transmitted wavelength(s). In a further embodiment, transceiver 112 is configured to emit IR radiation and preferably comprises a semiconductor light emitting diode (LED). This type of device may also comprise a photodiode detector such as a PIN-type photodiode tuned to detect light of the emitted wavelengths. In yet a further embodiment, transceiver 112 comprises an ultrasonic transducer configured to emit ultrasonic pressure waves coupled to another pressure transducer tuned to detect these sound waves. To aid in source recognition and mitigate the effects of stray radiation, each of the embodiments of transceiver 112 described above preferably emits a pulsed signal comprising short duration, electromagnetic or sound emissions.

Reflector 116 is configured to operate in conjunction with transceiver 112, and thus is configured to reflect the type of signal emitted thereby. In the case wherein transceiver 112 emits UWB radiation, reflector 116 may be any surface that comprises a conduction band of free electrons such as any metallic surface. Reflectors for IR or laser sources may include materials such as polished stainless steel, aluminum alloys, or ceramics.

Figure 3:
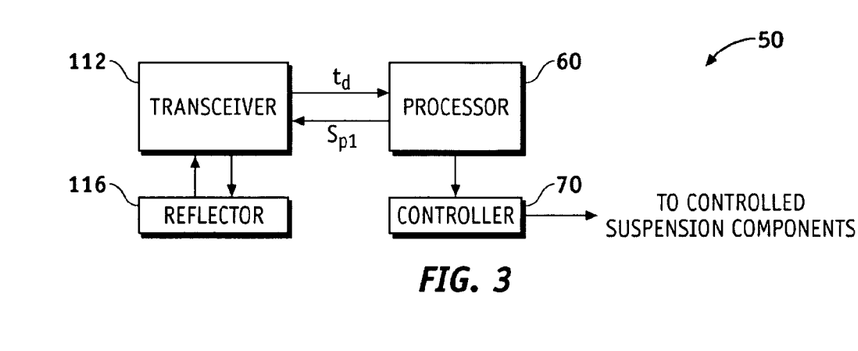
FIG. 3 is a block diagram of an exemplary height sensing system used with the suspension assembly illustrated in FIG. 2 in accordance with the current embodiment.

FIG. 3 is a block diagram of selected components of CCM 50 from vehicle 10 (FIG. 1) including transceiver 112, reflector 116, processor 60, and controller 70 in accordance with an exemplary embodiment. Processor 60 is operatively coupled to controller 70, and is coupled in two-way communication with transceiver 112. Transceiver 112 is configured to emit electromagnetic or ultrasonic interrogation signals toward reflector 116 when prompted by a signal, $S_{p1}$, from processor 60, and to detect the reflection of these interrogation signals reflected from reflector 116. Processor 60 records the time of prompting and transceiver 112 relays electronic timing signals indicative of detection timing ($t_d$) to processor 60. In an alternate embodiment, transceiver 112 may send electronic signals to processor 60 indicative of the timing of both emission and detection. Processor 60 uses this timing information in conjunction with an appropriate algorithm previously described to determine the distance or relative height between transceiver 112 and reflector 116. Controller 70 receives the height data as an input signal from processor 60, and dispatches real-time commands to controlled suspension elements in response to current chassis conditions as reflected by this data.

Figure 4:
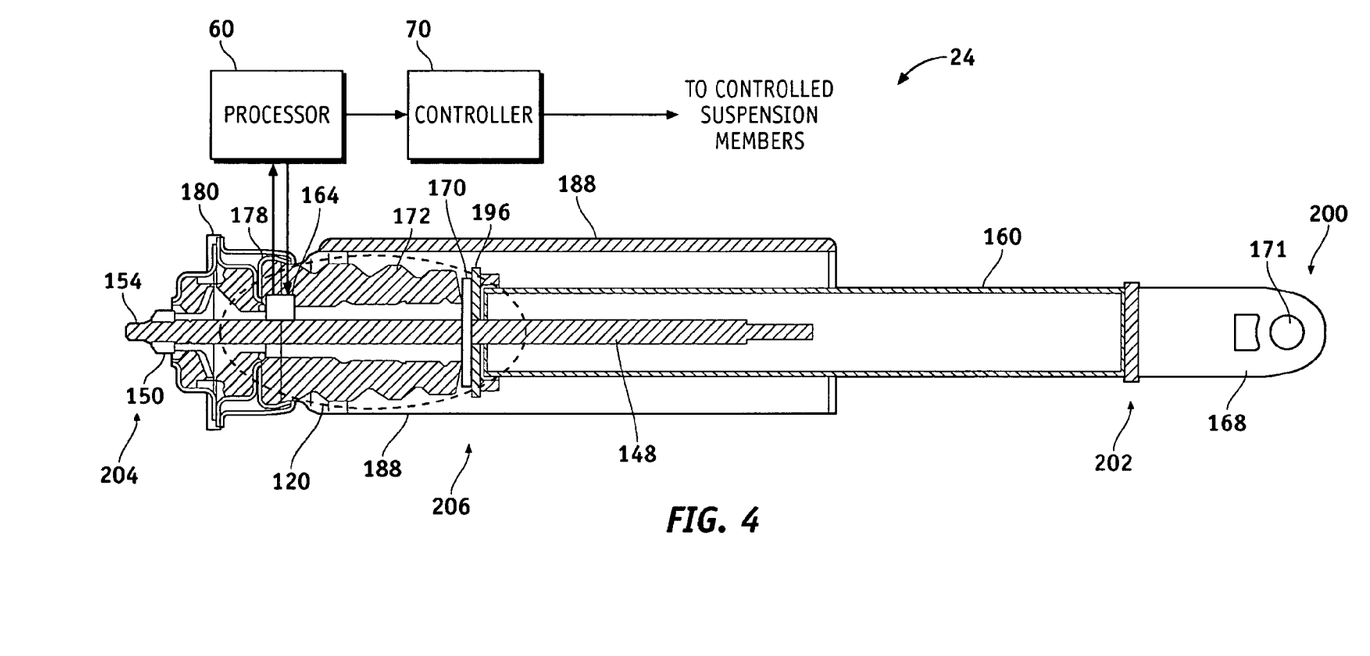
FIG. 4 is a cross-sectional view of a vehicular suspension damper assembly for use in the suspension assembly illustrated in FIG. 2 in accordance with the current embodiment.

FIG. 4 is a cross-sectional view of damper assembly 24 comprising a height sensor 120 in accordance with an exemplary embodiment. Damper assembly 24 includes a damper tube assembly 160, a cylindrical exterior housing or dust tube 188, a piston rod 148, an end portion 196, an upper mount assembly 180, and a lower mounting bracket 168. Damper assembly 24 is connected in a conventional manner to lower control arm 140 (FIG. 2) at a first end 200 via mounting bracket 168 having an opening 171 configured to be used in conjunction with a suitable fastener. Damper assembly 24 is conventionally connected at a second end 204 to frame structural member 108 by a self-locking flange nut 150 that fastens to a threaded end 154 of piston rod 148. Damper tube assembly 160 is connected to mounting bracket 168 (and thus to the unsprung vehicle mass) at a lower end 202, and is connected to end portion 196 at an upper end 206. Piston rod 148 is slidably coupled to and substantially concentric with damper tube assembly 160 and end portion 196. An optional jounce bumper 172 comprised of a hard rubber or any suitable elastomeric material is disposed substantially concentrically about piston rod 148, and is seated in a jounce bumper bracket 178 coupled to upper mount assembly 180. In the case wherein a jounce bumper is present, end portion 196 is a jounce bumper stopper, and if not present, end portion 196 is an end cap. Dust tube 188 is coupled to upper mount assembly 180 (and thus to the sprung vehicle mass), and is substantially concentric with and slidably coupled to damper tube assembly 160, and forms an outer housing for an upper portion of damper assembly 24.

In one embodiment, height sensor 120 comprises a transceiver 164 coupled to jounce bumper bracket 178 (sprung vehicle mass), and a reflector 170 coupled to end portion 196 (unsprung vehicle mass). Reflector 170 may comprise a separate component coupled to end portion 196, or may replace end portion 196. Transceiver 164 and reflector 170 may comprise any compatible combination of signal type and reflector previously described. Processor 60 is coupled to controller 70 and is coupled in two-way communication with transceiver 164. Processor 60 and/or controller 70 may be integrated within damper assembly 24 at any suitable location, or may be remotely located such as within CCM 50 (FIG. 1). The location of transceiver 164 and reflector 170 may be varied within damper assembly 24 provided one component is coupled to each vehicle mass and a sufficient line-of-sight between components, if needed, exists. For example, transceiver 164 may be coupled to dust tube 188 or upper mount assembly 180, and reflector 170 may be mounted to end portion 196 (as shown). In another embodiment (not shown), the positions of transceiver 164 and reflector 170 are reversed. That is, transceiver 164 is coupled to the unsprung mass and reflector 170 is coupled to the sprung mass, each attached to any of the suitable locations within damper assembly 24 described above. Accordingly, at least a portion of jounce bumper 172 may be removed as needed to accommodate the final position of transceiver 164 and reflector 170 and the need for line-of-sight between these components.

During operation, the vertical distance between sprung and unsprung vehicle masses changes dynamically depending on road conditions and vehicle speed, causing damper tube assembly 160 to move along piston rod 148 into and out of dust tube 188, changing accordingly the distance between transceiver 164 and reflector 170. Processor 60 prompts transceiver 164 to emit pulsed interrogation signals toward reflector 170 that are then reflected back to transceiver 164. Processor 60 records the time of prompting and transceiver 164 relays an electronic timing signal indicative of the timing of detection to processor 60 which is configured to determine the distance based on the time differential using an algorithm that may include equation (1) above.

Figure 5:
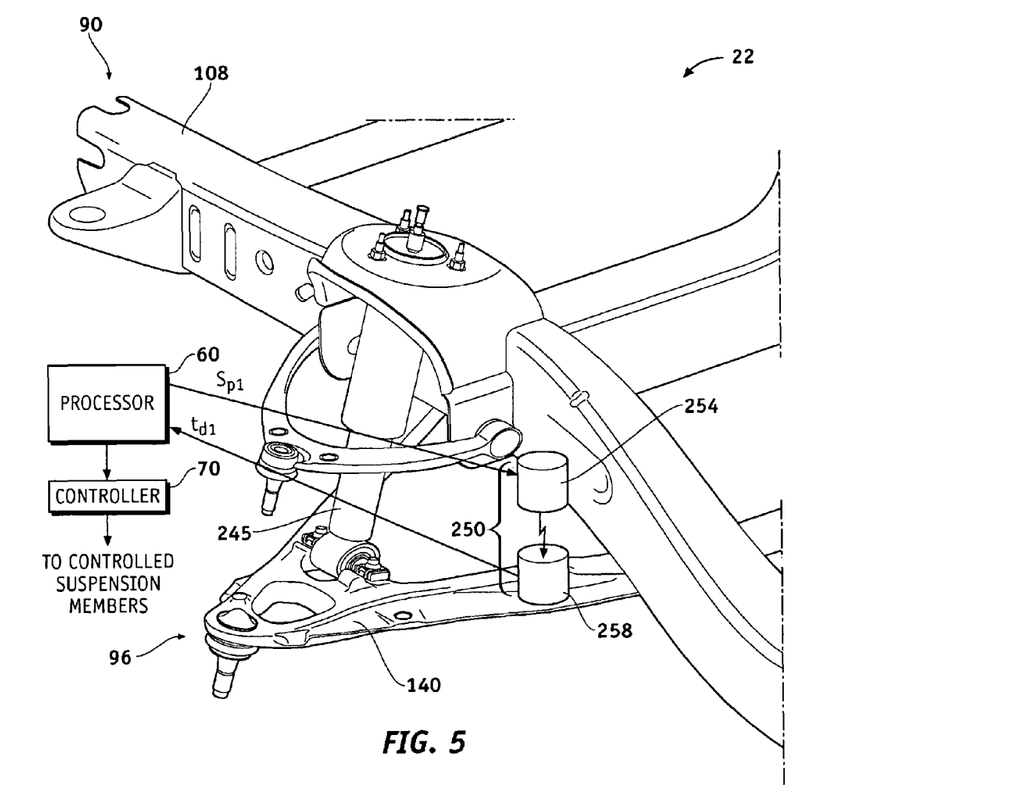
FIG. 5 is an isometric view of a vehicular suspension assembly for use in conjunction with the vehicle depicted in FIG. 1 in accordance with another exemplary embodiment.

FIG. 5 illustrates another height sensor 250 integrated into suspension assembly 22 in accordance with another exemplary embodiment. Suspension assembly 22 has a damper assembly 245 coupled between sprung mass 90 and unsprung mass 96 in a manner previously described for damper assembly 24 (FIG. 2). Height sensor 250 includes a transmitter 254 coupled in two-way communication to processor 60 of CCM 50 (FIG. 1). Transmitter 254 is mounted to a suitable component of sprung vehicle mass 90 such as frame structural member 108. Receiver 258 also communicates with processor 60 and is mounted to a component of unsprung vehicle mass 96 such as lower control arm 140. Transmitter 254 is configured to emit pulsed UWB, IR, laser, or ultrasound interrogation signals directed toward receiver 258 when prompted by a signal, $S_{p1}$, from processor 60, and may comprise any of the types of transmitters previously described. Receiver 258 is configured to detect signals from transmitter 254 and comprises a compatible detector of the types described above. Processor 60 records the time of prompting, and receiver 258 relays an electronic signal, $t_{d1}$, indicative of detection timing to processor 60. Processor 60 is configured with algorithms for converting such timing information to the actual time differential between emission and detection, and for determining the distance or relative height between sprung and unsprung vehicle masses, H, therefrom in accordance with equation (2):

$$H = c \times [\Delta t] \quad (2)$$

wherein c is the speed of propagation of the signal, and $\Delta t$ is the time differential. In another embodiment, the positions of transmitter 254 and receiver 258 are reversed and transmitter 254 is coupled to a suitable component of the unsprung mass 96, and receiver 258 is coupled to a suitable component of the sprung mass 90. In a similar manner, transmitter 254 emits a pulsed signal that is detected by receiver 258. Timing signals are transferred to processor 60 wherein the time differential between emission and detection and the concomitant distance or relative height are similarly determined.

Figure 6:
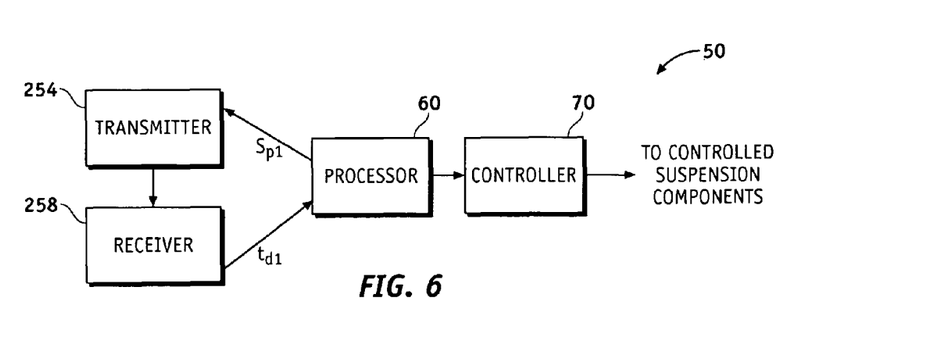
FIG. 6 is a block diagram of an exemplary height sensing system used with the suspension assembly illustrated in FIG. 2 in accordance with the current embodiment.

FIG. 6 is a block diagram of selected components of CCM 50 from vehicle 10 (FIG. 1) including transmitter 254, receiver 258, processor 60, and controller 70 in accordance with an exemplary embodiment. Processor 60 is operatively coupled to controller 70, and also communicates with transmitter 254. Processor 60 sends a prompting signal, $S_{p1}$, to transmitter 254 which is configured to emit electromagnetic or ultrasonic interrogation signals toward receiver 258 when prompted. Preferably, processor 60 records the time of prompting or, alternatively, transmitter 254 sends an electronic signal to processor 60 indicative of the time of emission. Receiver 258 detects the interrogation signal from transmitter 254 and sends a timing signal, $t_{d1}$, indicative of the timing of signal detection to processor 60. Processor 60 uses this timing information in conjunction with an appropriate algorithm that may include equation (2) above to determine the distance or relative height between transmitter 254 and receiver 258. Controller 70 receives this relative height data as an input signal from processor 60, and dispatches real-time commands to controlled suspension elements in response to current chassis conditions.

Figure 7:
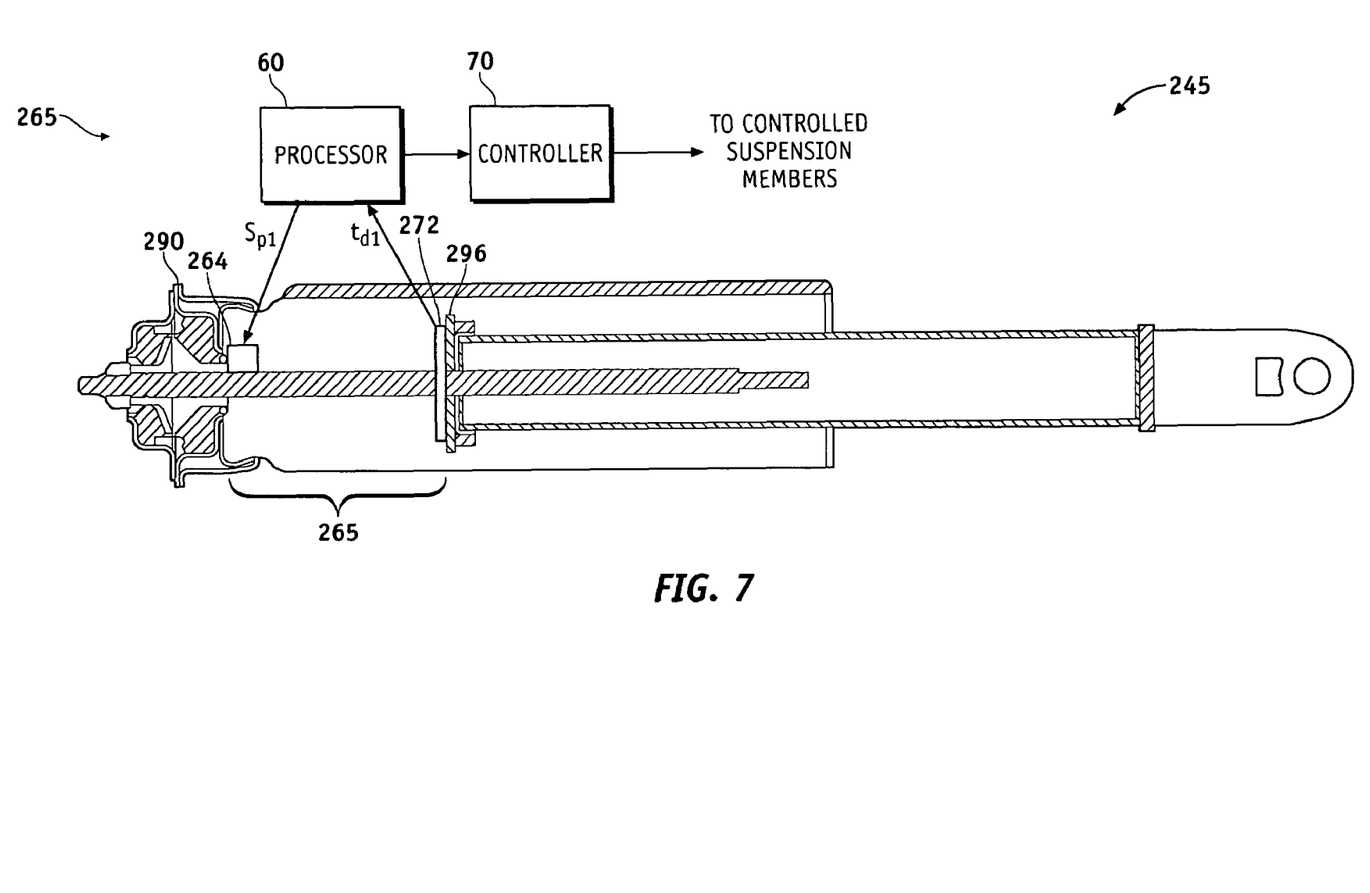
FIG. 7 is a cross-sectional view of a vehicular suspension damper assembly for use in the suspension assembly illustrated in FIG. 5 in accordance with the current embodiment.

FIG. 7 illustrates damper assembly 245 having an integrated height sensor 265 in accordance with yet another embodiment. Damper assembly 245 has many of the same mounting and internal components that have been previously described for damper assembly 24 (FIG. 2) and so, in the interest of brevity, these details will not be repeated. Height sensor 265 comprises a transmitter 264 coupled to a suitable location within damper assembly 245 such as, for example, to upper mount assembly 290 (sprung vehicle mass), and a receiver 272 coupled to an end portion 296 (unsprung vehicle mass). In the case where a jounce bumper is used (not shown) transmitter 264 may have a suitable housing to protect it. Processor 60 is operatively coupled to controller 70, and may send and/or receive electronic signals from transmitter 264, and may receive signals from receiver 272. Processor 60 sends prompting signals, $S_{p1}$, to transmitter 264 to emit interrogation signals directed toward receiver 272, and preferably records the time of prompting or, alternatively, receives timing signals from transmitter 264 indicative of emission timing. Receiver 272 detects these interrogation signals and transmits a timing signal, $t_{d1}$, to processor 60 indicative of the timing of signal detection. Processor 60 uses such timing information to generate data related to relative vehicle height in a manner described previously. This data may be sent to controller 70 configured to dispatch signals to selected controlled suspension members, that may include damper assembly 245, to make responsive chassis adjustments.

Relative height data generated by height sensors having either a transceiver/reflector or a transmitter/receiver configuration may also be used to determine the relative velocity and relative acceleration between suspension components. An average relative velocity, $V_a$, between two times, $t_1$ and $t_2$, may be determined using the instantaneous relative heights, $H_{i1}$ and $H_{i2}$ at $t_1$ and $t_2$, respectively, using an appropriate algorithm that may include equation (3):

$$V_a = \frac{(H_{i2} - H_{i1})}{(t_2 - t_1)} \quad (3)$$

Instantaneous relative velocity, $V_i$, may also be determined using an appropriate algorithm that may include equation (4):

$$V_i = \lim_{t_2 \to t_1} \left[ \frac{(H_{i2} - H_{i1})}{(t_2 - t_1)} \right] \quad (4)$$

wherein $t_2$ approaches $t_1$.

Data relating to instantaneous relative velocity may be similarly used to determine an average relative acceleration, $A_a$, using an appropriate algorithm that may include equation (5):

$$A_a = \frac{(V_{i2} - V_{i1})}{(t_2 - t_1)} \quad (5)$$

wherein $V_{i2}$ is the instantaneous velocity at time $t_2$, and $V_{i1}$ is the instantaneous velocity at time $t_1$. Instantaneous acceleration $A_i$ may then be determined using an appropriate algorithm that may include equation (6):

$$A_i = \lim_{t_2 \to t_1} \left[ \frac{(V_{i2} - V_{i1})}{(t_2 - t_1)} \right] \quad (6)$$

wherein $t_2$ approaches $t_1$.

Figure 8:
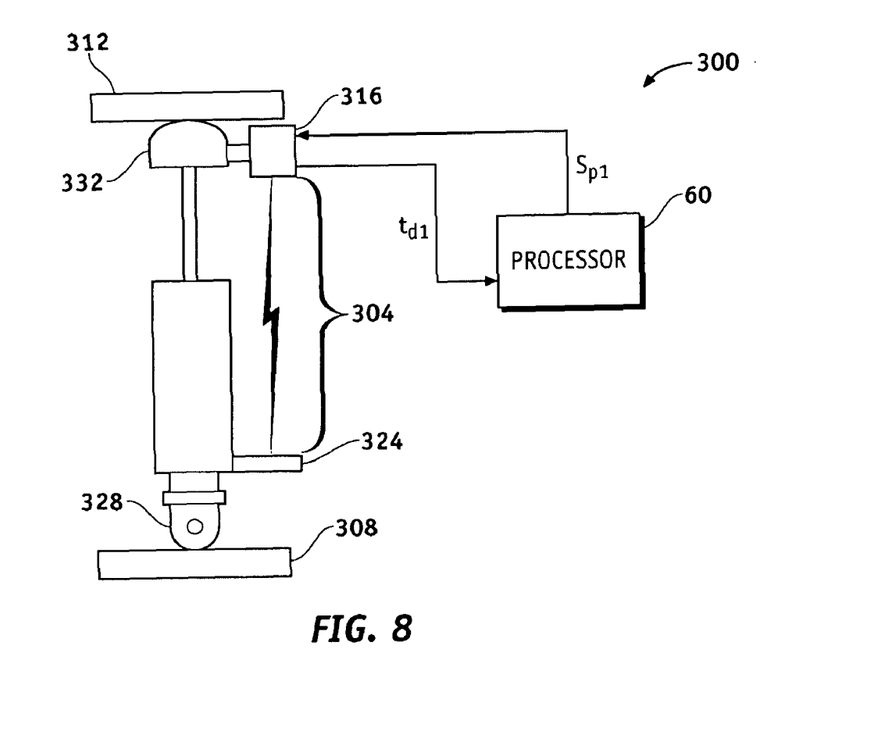
FIG. 8 is an isometric view of a vehicular suspension actuator assembly for use in conjunction with the vehicle depicted in FIG. 1 in accordance with another exemplary embodiment.

FIG. 8 illustrates a suspension actuator 300 having a height sensor 304 for measuring the distance of travel of actuator 300 in accordance with another exemplary embodiment. Suspension actuator 300 may be, for example, a passive damper assembly including a shock absorber or a strut, or an actively controlled actuator such as a linear actuator. In the example depicted in FIG. 8, suspension actuator 300 is a linear actuator having a first portion 328 coupled to a first suspension member 308 and a second portion 332 coupled to a second suspension member 312. First portion 328 is fixed relative to second portion 332 which moves in and out of first portion 328 in a well known manner in response to vehicle motion and/or controller commands. The distance of travel is defined as the amount of linear travel of second portion 332 with respect to a reference/zero position such as where second portion 332 is fully retracted within first portion 328. Distance of travel is thus the difference between the relative height determined at the position of interest and the relative height determined at the reference position.

Height sensor 304 includes a transceiver 316 coupled to second portion 332 and a reflector 324 coupled to first portion 328. These components may be any compatible combination of transceiver/reflector of the types previously described. Transceiver 316 is coupled in two-way communication with processor 60 and is configured to emit interrogation signals directed toward reflector 324 when prompted by a signal, $S_{p1}$, from processor 60, and to receive a reflection of the interrogation signals from reflector 324. Processor 60 records the time of prompting, and transceiver 316 sends an electronic signal, $t_{d1}$, indicative of detection timing to processor 60. Processor 60 is configured with algorithms described above for determining the relative height or distance between transceiver 316 and reflector 324. The distance of travel, $D_T$, at a time $t_1$ may be determined using algorithms that may include equation (7) below:

$$D_T = H_{t1} - H_R \qquad (7)$$

wherein $H_R$ is the relative height determined at the reference position, and $H_{t1}$ is the relative height determined at time $t_1$.

Figure 9:
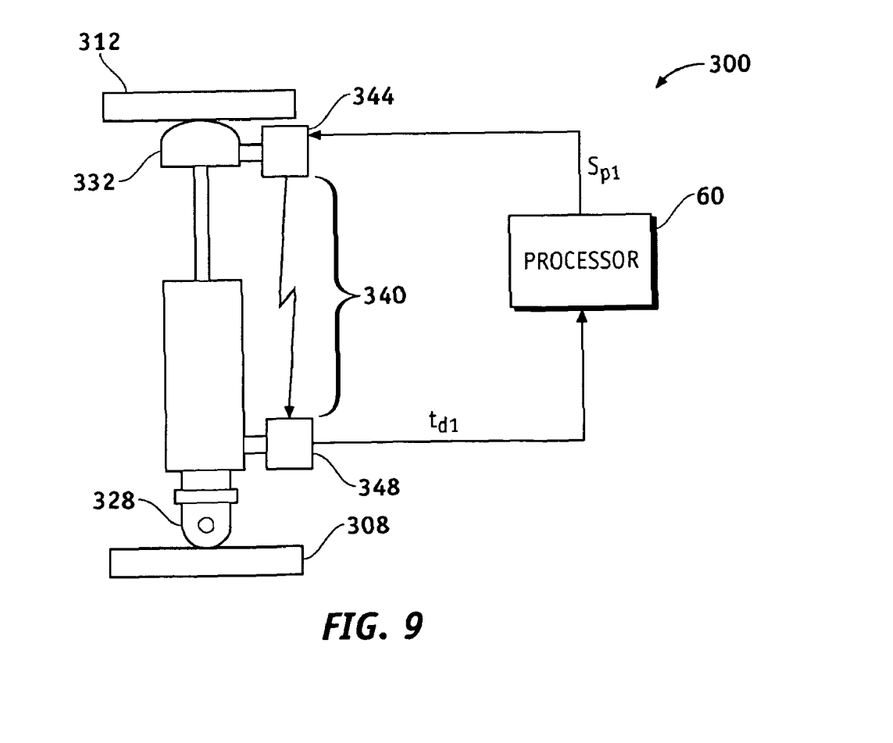
FIG. 9 is an isometric view of a vehicular suspension actuator for use in conjunction with the vehicle depicted in FIG. 1 in accordance with yet another exemplary embodiment.

FIG. 9 illustrates suspension actuator 300 having a height sensor 340 for measuring the distance of travel of actuator 300 in accordance with yet another exemplary embodiment. Height sensor 340 includes a transmitter 344 coupled to second portion 332 and a receiver 348 coupled to first portion 328. Processor 60 sends prompting signals, $S_{p1}$, to transmitter 344 to emit interrogation signals toward receiver 348, and records the time of prompting. Receiver 348 detects the interrogation signals and sends timing signals, $t_{d1}$, to processor 60 indicative of the timing of detection. Processor 60 determines the distance of travel of actuator 300 at a specified time using algorithms that may include equation (7) above.

The embodiments described herein provide a height sensor for determining the distance or relative height between components of a vehicular suspension. Processor-controlled systems use pulsed electromagnetic or ultrasonic pressure wave interrogation signals emitted and detected using either transceiver/reflector or transmitter/receiver configurations. Electronic timing signals indicative of emission and detection timing are sent to a processor configured to determine the time differentials and the corresponding relative height. Relative height data generated over a time interval may be used to determine both relative velocity and relative acceleration between suspension members for that interval. Further, relative height may be used to determine the distance of travel of a passive or actively controlled suspension actuator at a specific time. Such data relating to component relative height, distance of travel, velocity, and/or acceleration may be relayed to a suspension processor/controller to provide real time chassis suspension control to enhance driving stability and handling performance.

The preceding detailed description is merely illustrative in nature and is not intended to limit the invention or the application and uses of the invention. Furthermore, there is no intention to be bound by any expressed or implied theory presented in the preceding technical field, background, brief summary, or detailed description. The invention may be described herein in terms of functional and/or logical block components and various processing steps. It should be appreciated that such block components may be realized by any number of hardware, software, and/or firmware components configured to perform the specified functions.

The preceding description refers to elements or nodes or features being "connected" or "coupled" together. As used herein, unless expressly stated otherwise, "connected" means that one element/node/feature is directly joined to (or directly communicates with) another element, node or other feature in a mechanical, logical, electrical or other appropriate sense. Likewise, unless expressly stated otherwise, "coupled" means that one element/node/feature is directly or indirectly joined to (or directly or indirectly communicates with) another element/node/feature in a mechanical, logical, electrical or other appropriate sense. The term "exemplary" is used in the sense of "example," rather than "model." Further, although the figures may depict example arrangements of elements, additional intervening elements, devices, features, or components may be present in a practical embodiment of the invention.

While at least one example embodiment has been presented in the foregoing detailed description, it should be appreciated that a vast number of variations exist. It should also be appreciated that the example embodiment or embodiments described herein are not intended to limit the scope, applicability, or configuration of the invention in any way. Rather, the foregoing detailed description will provide those skilled in the art with a convenient road map for implementing the described embodiment or embodiments. It should be understood that various changes can be made in the function and arrangement of elements without departing from the scope of the invention and the legal equivalents thereof.

What is claimed is:

1. A system for determining a distance between a sprung mass of a vehicular suspension assembly, and an unsprung mass of the suspension assembly, the system comprising:
    a transceiver coupled to a first one of the sprung mass or the unsprung mass and configured to move therewith, the transceiver further configured for emitting a first signal toward a second one of the sprung mass or the unsprung mass, the second one being different from the first one, and for receiving a reflection of the first signal from the second one;
    a reflector coupled to the second one of the sprung mass and the unsprung mass and configured to move therewith, the reflector further configured to reflect the first signal; and
    a processor coupled to the transceiver for determining the distance between the unsprung mass and the sprung mass.

2. A system according to claim 1, wherein the processor if further configured to provide instructions to the transceiver for emitting the first signal.

3. A system according to claim 2, wherein the transceiver is coupled to the sprung mass and configured to move therewith, and the reflector is coupled to the unsprung mass and configured to move therewith.

4. A system according to claim 1, wherein the transceiver is configured to emit UWB signals, and the first signal is a UWB signal.

5. A system according to claim 2, wherein the suspension assembly comprises an actuator assembly coupled between the unsprung mass and the sprung mass, and wherein the transceiver is coupled to the actuator assembly.

6. A system according to claim 3, wherein the suspension assembly comprises a damper assembly coupled between the sprung mass and the unsprung mass, and wherein the transceiver is coupled to the damper assembly.

7. A system according to claim 6, wherein the damper assembly comprises:
- an upper mount assembly coupled to the sprung mass;
- a dust tube coupled to the upper mount assembly; and
- a damper tube assembly having a first end and a second end, the damper tube assembly coupled at the second end to the unsprung mass, and slidably coupled within the dust tube.

8. A system according to claim 7, wherein the transceiver is coupled to the upper mount assembly.

9. A system according to claim 7, wherein the transceiver is coupled to the damper tube assembly.

10. A system according to claim 1, wherein the processor is further configured to determine a relative velocity between the sprung mass and the unsprung mass.

11. A system for determining a distance between a sprung mass of a vehicular suspension assembly, and an unsprung mass of the suspension assembly, the system comprising:
- a transmitter coupled to a first one of the sprung mass or the unsprug mass and configured to move therewith, the transmitter configured for emitting a first signal;
- a receiver coupled to a second one of the sprung mass or the unsprug mass and configured to move therewith, the second one being different from the first one, the receiver further configured for detecting the first signal; and
- a processor coupled to the transmitter and the receiver, the processor configured to determine the distance between the sprung mass and the unsprung mass.

12. A system according to claim 11, wherein the suspension assembly comprises an actuator assembly coupled between the first portion and the second portion, and wherein the transmitter is coupled to the actuator assembly.

13. A system according to claim 11, wherein the transmitter is coupled to the sprung mass and configured to move therewith, and the receiver is coupled to the unsprung mass and configured to move therewith.

14. A system according to claim 13, wherein the suspension assembly further comprises a damper assembly coupled between the sprung mass and the unsprung mass, and wherein the transmitter is coupled to the damper assembly.

15. A system according to claim 14, wherein the damper assembly comprises:
- an upper mount assembly coupled to the sprung mass;
- a dust tube coupled to the upper mount assembly; and
- a damper tube assembly having a first end and a second end, the damper tube assembly coupled to the unsprung mass at the second end, and slidably coupled within the dust tube.

16. A system according to claim 15, wherein the transmitter is coupled to the upper mount assembly.

17. A system according to claim 15, wherein the transmitter is coupled to the damper tube assembly.

18. A system according to claim 15, further comprising a damper tube end portion coupled to the first end of the damper tube assembly, and wherein the transmitter is coupled to the damper tube end portion.

19. A system according to claim 15, wherein:
- the processor is further configured to provide instructions to the transmitter for providing the first signal and to determine a relative acceleration between the sprung mass and the unsprung mass.

* * * * *